March 11, 1969  F. K. DU PRÉ  3,431,788
PISTON ROD GUIDE FOR RHOMBIC DRIVE STIRLING CYCLE APPARATUS
Filed March 1, 1967

INVENTOR.
Frits K. du Pré

BY

AGENT

# United States Patent Office 3,431,788
Patented Mar. 11, 1969

3,431,788
PISTON ROD GUIDE FOR RHOMBIC DRIVE
STIRLING CYCLE APPARATUS
Frits Karel du Pré, White Plains, N.Y., assignor to North American Philips Co., Inc., New York, N.Y., a corporation of Delaware
Filed Mar. 1, 1967, Ser. No. 619,702
U.S. Cl. 74—44
Int. Cl. F16h 21/22
5 Claims

ABSTRACT OF THE DISCLOSURE

This invention provides an improved rhombic drive mechanism for apparatus such as a Stirling cycle hot gas engine. Concentric rods from the reciprocating power piston and displacer piston are connected to corresponding yokes, and the two ends of each yoke are linked by connecting rods to two separate eccentric drive motors. Balanced and synchronous operation of the drive is assured by a sleeve guide about the pistons, which eliminates the need for precision meshing gears directly interconnecting the two drive motors in the prior art.

---

The present invention relates to a rhombic drive mechanism for a hot gas reciprocating apparatus operating on the Stirling cycle principle and, for example, being a cold gas refrigerator. More particularly, the invention is directed to a guide for the piston rod of the apparatus which guides the piston rod in its vertical movement and at the same time substantially prevents undesirable side thrust on the piston.

An object of the present invention is to provide a guide construction for a piston rod which eliminates gearing on drive shafts of the motors driving said cold gas refrigerator, and consequently reduces both expense and noise.

A further object of the present invention is to greatly reduce the assembly complication of the present apparatus without sacrificing the perfect balance of the apparatus.

It is also within the scope of the present invention to provide the present guide for a piston rod in the construction of a hot gas engine operating on the Stirling cycle principle and which drives two identical loads on the two shafts.

The above and other features, objects and advantages of the present invention will be fully understood from the following description considered in connection with the accompanying illustrative drawings.

Figure 1:
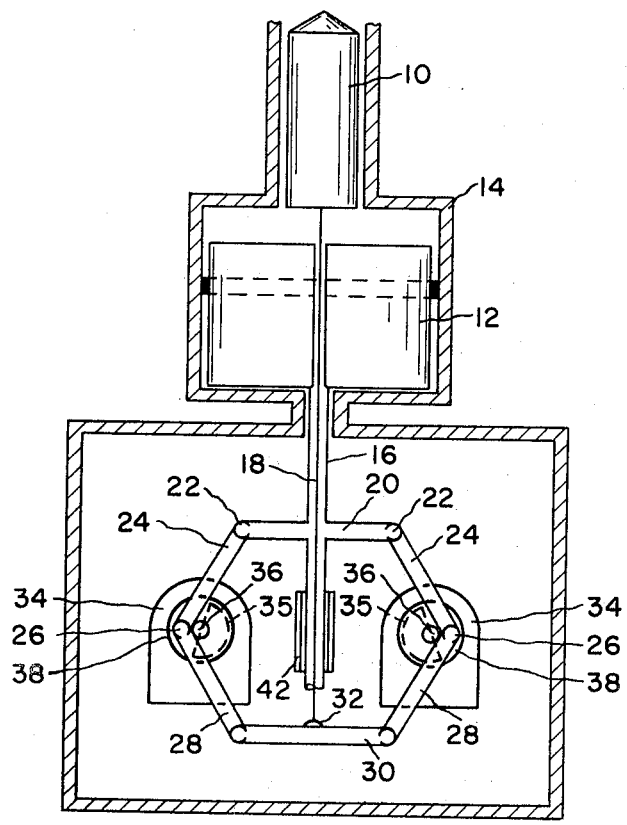
FIG. 1 is a partial side elevational and a partial sectional view of the hot gas reciprocating apparatus disclosing applicant's novel guide for the piston rod.

Referring more particularly to the drawing, the present invention is incorporated in a Stirling cycle refrigerator provided with a rhombic drive of the type disclosed in U.S. Pat. No. 2,885,855 to R. J. Meijer in which a displacer piston 10 and a power piston 12 are adapted to reciprocate in cylinder 14. The power piston 12 is provided with a hollow piston rod 16 while the displacer piston 10 is provided with a displacer piston rod 18. The hollow piston rod 16 is connected to a yoke 20. Yoke 20 is provided with pivots 22 to which are secured the adjacent ends of the piston connecting rods 24. The displacer piston rod 18 passes through the hollow power piston rod 16. The connecting rods 24 are connected at pivot points 26 to displacer connecting rods 28. The other ends of connecting rods 28 are connected to yoke 30 while the displacer rod 18 is secured to yoke 30 at point 32. In the FIG. 2 an extended hollow piston rod 16 is provided with a pair of elongated slots 40 through which the yoke 30 freely passes.

Two identical motors 34 rotating in opposite directions, have drive shafts 36 which have eccentrics 38 mounted thereon. The eccentrics 38 are provided with pivot points 26 whereby the rotation of the eccentrics causes the prescribed movement of the piston connecting rods 24 and the displacer connecting rods 28. In addition, counterweights 35 are attached to eccentrics 38.

Figure 2:
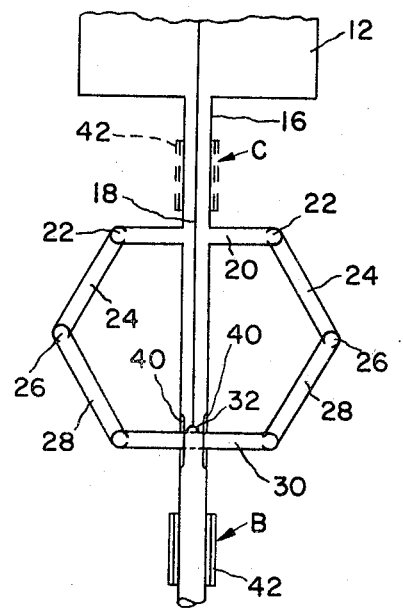
FIG. 2 is a side elevational view of another embodiment of the invention incorporating a guide for the piston rod of a hot gas reciprocating apparatus.

It should be noted that there are no meshing gear wheels operatively connected to drive shafts 36. However, in order to achieve perfect balancing of the present rhombic drive Stirling cycle refrigerator which requires linear motion of the pistons, a guide 42 for the piston rods has been devised. The guide 42 may take the form of a hollow, self-lubricating sleeve, or an annular device having ball bearings as the guiding means. The annular device with ball bearings is commonly known as a ball bushing or a linear ball bearing. In addition, as shown in FIG. 2, the guide 42 may be located alternately at the positions B or C. It should be noted that in position B the guide 42 surrounds only the piston rod 16 while in position C the guide 42 surrounds both the piston rod 16 and the displacer rod 18 but guides only the piston rod 16.

Although two substantially identical motors 34 drive identical eccentrics 38 in opposite directions sometimes slight differences in motor torques cause very small side thrusts to occur. Hence the guide 42 contains these side thrusts and the friction and wear thereon will be negligible. Accordingly, the construction of the present rhombic drive mechanism is greatly simplified without sacrificing the perfect balancing arrangement of the drive.

Heretofore, the prevention of side thrust on the piston and displacer was achieved by means of high precision meshing gears which had a minimum of noise and vibration due to gear teeth play. In addition, the gears had to be carefully adjusted in order to ensure complete symmetry of the drive. The foregoing problems have been eliminated by the present simplified rhombic drive mechanism. Moreover, the present construction may be incorporated in a hot gas engine which drives two identical loads on two shafts, said loads being, for example, electrical generators.

What I claim is:

1. In a drive arrangement for a hot gas, Stirling cycle apparatus having a cylinder, a power piston and a displacer piston including corresponding piston rods reciprocating in said cylinder, identical eccentrics located one on each side of a plane passing through the center line of said apparatus, separate means rotating said eccentrics synchronously and substantially in phase and in opposite directions, a separate yoke connected to each of said power piston and displacer piston rods, and power piston and displacer piston connecting rods linking said yokes to said eccentrics, the improvement comprising a sleeve-like guide at least partially surrounding a portion of one of said piston rods for guiding said rods in their linear motion.

2. A drive arrangement for a Stirling cycle hot gas reciprocating apparatus as claimed in claim 1, wherein said guide is positioned about both said power piston rod and said displacer piston rod.

3. A drive arrangement for a Stirling cycle hot gas reciprocating apparatus as claimed in claim 1 wherein said guide is positioned about said power piston rod only.

4. A drive arrangement for a hot gas Stirling cycle apparatus as claimed in claim 1 wherein said power piston rod is hollow and provided with aligned, elongated slots, and the yoke for said displacer piston rod passes through said aligned slots.

5. A drive arrangement for a hot gas Stirling cycle apparatus as claimed in claim 1 wherein said guide is in the form of an annular device provided with ball bearings as the guiding means.

References Cited

UNITED STATES PATENTS

| | | | |
|---|---|---|---|
| 2,982,088 | 5/1961 | Meijer | 60—24 |
| 3,220,177 | 10/1965 | Kohler | 60—24 |
| 3,302,393 | 2/1967 | Meyer et al. | 60—24 |
| 3,364,699 | 1/1968 | Hufstedler et al. | 308—6 X |

MILTON KAUFMAN, *Primary Examiner.*

U.S. Cl. X.R.

60—24; 123—51